(12) United States Patent
Furudate et al.

(10) Patent No.: US 12,304,831 B2
(45) Date of Patent: May 20, 2025

(54) TITANIUM OXIDE PARTICLES, TITANIUM OXIDE PARTICLE DISPERSION LIQUID, AND METHOD FOR PRODUCING TITANIUM OXIDE PARTICLE DISPERSION LIQUID

(71) Applicant: SHIN-ETSU CHEMICAL CO., LTD., Tokyo (JP)

(72) Inventors: Manabu Furudate, Kamisu (JP); Tomohiro Inoue, Kamisu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 596 days.

(21) Appl. No.: 17/766,138

(22) PCT Filed: Sep. 29, 2020

(86) PCT No.: PCT/JP2020/036779
§ 371 (c)(1),
(2) Date: Apr. 1, 2022

(87) PCT Pub. No.: WO2021/065852
PCT Pub. Date: Apr. 8, 2021

(65) Prior Publication Data
US 2022/0402770 A1 Dec. 22, 2022

(30) Foreign Application Priority Data
Oct. 2, 2019 (JP) .................................. 2019-181873

(51) Int. Cl.
| | | |
|---|---|---|
| *C01G 23/053* | (2006.01) | |
| *B01J 21/06* | (2006.01) | |
| *B01J 35/39* | (2024.01) | |
| *B01J 35/40* | (2024.01) | |
| *B01J 37/08* | (2006.01) | |
| *B82Y 30/00* | (2011.01) | |
| *B82Y 40/00* | (2011.01) | |
| *C01G 23/08* | (2006.01) | |

(52) U.S. Cl.
CPC ........ *C01G 23/0536* (2013.01); *B01J 21/063* (2013.01); *B01J 35/39* (2024.01); *B01J 35/40* (2024.01); *B01J 37/088* (2013.01); *B82Y 30/00* (2013.01); *B82Y 40/00* (2013.01); *C01G 23/08* (2013.01); *C01P 2002/50* (2013.01); *C01P 2002/60* (2013.01)

(58) Field of Classification Search
CPC . B01J 21/063; B01J 23/14; B01J 23/34; B01J 23/75; B01J 23/835; B01J 35/39; B01J 35/40; B01J 37/088; C01G 23/0536; C01G 23/08; C01P 2002/50; C01P 2002/60; B82Y 30/00; B82Y 40/00
USPC .................. 502/324, 350; 423/610
See application file for complete search history.

(56) References Cited

U.S. PATENT DOCUMENTS

| | | | |
|---|---|---|---|
| 7,575,731 B2 * | 8/2009 | Iijima ...................... | C09D 7/62 423/71 |
| 2010/0189940 A1 | 7/2010 | Grothe et al. | |
| 2010/0202960 A1* | 8/2010 | Enomura ............... | B01F 25/741 423/610 |
| 2012/0065312 A1 | 3/2012 | Ishihara et al. | |
| 2012/0214667 A1* | 8/2012 | Furudate .................. | B01J 37/10 977/773 |
| 2014/0023855 A1 | 1/2014 | Masuda et al. | |
| 2015/0299417 A1 | 10/2015 | Masuda et al. | |
| 2016/0108258 A1 | 4/2016 | Masuda | |
| 2016/0271922 A1* | 9/2016 | Uzawa ............... | C01G 23/0536 |
| 2019/0217282 A1 | 7/2019 | Furudate et al. | |

FOREIGN PATENT DOCUMENTS

| | | | | |
|---|---|---|---|---|
| CN | 109477337 A | * | 3/2019 | ............. A61L 2/084 |
| EP | 0 992 456 A1 | | 4/2000 | |
| EP | 3275536 A1 | * | 1/2018 | ............... A61L 9/00 |
| EP | 2 057 235 B1 | | 5/2018 | |
| EP | 3 505 580 A1 | | 7/2019 | |
| JP | 63-225532 A | | 9/1988 | |
| JP | 2003-327430 A | | 11/2003 | |
| JP | 2003-327431 A | | 11/2003 | |
| JP | 2005-120137 A | | 5/2005 | |
| JP | 2010-501707 A | | 1/2010 | |
| JP | 2012-56816 A | | 3/2012 | |
| JP | 2012-77267 A | | 4/2012 | |
| JP | 2014-19611 A | | 2/2014 | |
| JP | 2014-38293 A | | 2/2014 | |
| JP | 2014-151266 A | | 8/2014 | |
| JP | 2016-14132 A | | 1/2016 | |
| JP | 2016-79395 A | | 5/2016 | |
| JP | 2019143047 A | * | 8/2019 | ............. C08L 83/07 |
| KR | 20140011959 A | * | 1/2014 | ........... C09C 1/3684 |
| WO | WO 2012/046493 A1 | | 4/2012 | |
| WO | WO 2018/047694 A1 | | 3/2018 | |

OTHER PUBLICATIONS

Chinese Office Action and Search Report for Chinese Application No. 202080069606.4, dated Jan. 8, 2024, with English translation.
International Search Report for PCT/JP2020/036779 mailed on Dec. 8, 2020.

(Continued)

*Primary Examiner* — Patricia L. Hailey
(74) *Attorney, Agent, or Firm* — Birch, Stewart, Kolasch & Birch, LLP

(57) ABSTRACT

Provided is a titanium oxide particle dispersion liquid with an inhibited photocatalytic activity and a low level of coloration. Titanium oxide particles in this dispersion liquid contain:
 (1) a tin component; and
 (2) a manganese component and/or a cobalt component, wherein only the tin component is solid-dissolved in the titanium oxide particles, and the manganese component and/or the cobalt component are each contained by an amount of 5 to 5,000 in terms of a molar ratio to titanium (Ti/Mn and/or Ti/Co).

8 Claims, No Drawings

(56) References Cited

OTHER PUBLICATIONS

Written Opinion of the International Searching Authority for PCT/JP2020/036779 mailed on Dec. 8, 2020.
Extended European Search Report dated Sep. 25, 2023 for Application No. 20872942.6.
Japanese Office Action for Japanese Application No. 2019-181873, dated Aug. 30, 2022, with an English translation.

* cited by examiner

TITANIUM OXIDE PARTICLES, TITANIUM OXIDE PARTICLE DISPERSION LIQUID, AND METHOD FOR PRODUCING TITANIUM OXIDE PARTICLE DISPERSION LIQUID

TECHNICAL FIELD

The present invention relates to titanium oxide particles, a titanium oxide particle dispersion liquid, and a method for producing a titanium oxide particle dispersion liquid.

BACKGROUND ART

Resin molded products and films or the like are known to exhibit deterioration in mechanical properties such as elasticity and tensile strength, cracks, and deterioration in appearance such as gloss deterioration and discoloring, when exposed to the ultraviolet light in the sunlight for a long period of time.

In order to solve these problems, when molding or processing a resin, there may be added to the resin an organic ultraviolet absorber such as a benzotriazole compound, a triazine compound, and a benzophenone compound; and/or an inorganic ultraviolet absorber such as titanium oxide and zinc oxide.

However, organic ultraviolet absorbers are not suitable for uses requiring a long-term weather resistance as they have a problem of gradually losing their ultraviolet absorbency when exposed to ultraviolet light.

Meanwhile, inorganic ultraviolet absorbers do not exhibit a deteriorated ultraviolet absorbency even when exposed to ultraviolet light; titanium oxide and zinc oxide, upon absorption of ultraviolet light, will function as photocatalysts so as to generate active species, thereby deteriorating a resin in contact therewith. Therefore, it is necessary to inhibit the influence of a photocatalytic activity so as to achieve a long-term weather resistance. Further, it is required that a particle size be small enough as the transparency of a resin will deteriorate if the particle size of titanium oxide and zinc oxide added to the resin is large (Patent document 1).

As a way of preventing a resin from being deteriorated by photocatalytic activity, there are generally known, for example, a method of avoiding a direct contact between titanium oxide and a resin by coating the surfaces of titanium oxide particles with an oxide or hydroxide of aluminum, silicon, zirconium or the like; and a method of lowering the photocatalytic activity of titanium oxide itself by solid-dissolving a dissimilar metal such as manganese and cobalt into the crystal of the titanium oxide (Patent documents 2, 3 and 4).

However, the problems with these methods are that with the former method of performing surface coating alone, the influence of a photocatalytic activity cannot be satisfactorily inhibited for a long period of time; and that with the latter method of solid-dissolving a dissimilar metal, while a long-term weather resistance can be achieved as photocatalytic activity can be satisfactorily inhibited, the design property of a resin will be impaired upon coloration of titanium oxide by the solid-dissolved dissimilar metal.

PRIOR ART DOCUMENTS

Patent Documents

Patent document 1: JP-A-2005-120137
Patent document 2: JP-A-Sho 63-225532
Patent document 3: JP-A-2003-327430
Patent document 4: JP-A-2003-327431

SUMMARY OF THE INVENTION

Problems to be Solved by the Invention

Thus, it is an object of the present invention to provide titanium oxide particles and a titanium oxide particle dispersion liquid that are capable of imparting a long-term weather resistance to a resin material, and are useful for an inorganic ultraviolet absorber with a satisfactorily inhibited photocatalytic activity and a low level of coloration.

Means to Solve the Problems

The inventors of the present invention diligently conducted a series of studies to achieve the above object, and completed the invention as follows. That is, the inventors found that by adding a manganese component and/or a cobalt component to titanium oxide particles with a tin component solid-dissolved therein, there could be obtained titanium oxide particles with a satisfactorily inhibited photocatalytic activity and a low level of coloration even if the manganese component and/or the cobalt component are not solid-dissolved in titanium oxide.

Thus, the present invention is to provide the following titanium oxide particles, a member having the same, a titanium oxide particle dispersion liquid, and a method for producing such titanium oxide particle dispersion liquid.

[1]
Titanium oxide particles comprising:
(1) a tin component; and
(2) a manganese component and/or a cobalt component, wherein only the tin component is solid-dissolved in the titanium oxide particles, and the manganese component and/or the cobalt component are each contained by an amount of 5 to 5,000 in terms of a molar ratio to titanium (Ti/Mn and/or Ti/Co).

[2]
A member having a film of the titanium oxide particles according to [1].

[3]
A titanium oxide particle dispersion liquid comprising:
(1) titanium oxide particles with a tin component solid-dissolved therein; and
(2) a manganese component and/or a cobalt component, wherein the manganese component and/or the cobalt component are each contained by an amount of 5 to 5,000 in terms of a molar ratio to titanium (Ti/Mn and/or Ti/Co).

[4]
The titanium oxide particle dispersion liquid according to [3], wherein a color difference ($\Delta E^*_{ab}$) between
(a) a titanium oxide particle dispersion liquid in which a solid content concentration is 1% by mass, and the tin component is solid-dissolved and contained by an amount of 20 in terms of a molar ratio to titanium (Ti/Sn); and
(b) the titanium oxide particle dispersion liquid according to claim 3 in which a solid content concentration is 1% by mass, is not larger than 30.

[5]
The titanium oxide particle dispersion liquid according to [3] or [4] further comprising a silicon component.

[6]
The titanium oxide particle dispersion liquid according to any one of [3] to [5], wherein the tin component solid-dissolved in titanium oxide is contained by an amount of 1 to 1,000 in terms of a molar ratio to titanium (Ti/Sn).

[7]

The titanium oxide particle dispersion liquid according to any one of [3] to [6], wherein the manganese component and/or the cobalt component are each contained by an amount of 10 to 3,000 in terms of a molar ratio to titanium (Ti/Mn and/or Ti/Co).

[8]

A method for producing the titanium oxide particle dispersion liquid according to [3] to [7], comprising:
(1) a step of producing a tin component-containing peroxotitanic acid solution from a raw material titanium compound, tin compound, basic substance, hydrogen peroxide and aqueous dispersion medium;
(2) a step of producing a tin component-containing titanium oxide particle dispersion liquid by heating the tin component-containing peroxotitanic acid solution produced in the step (1) at 80 to 250° C. under a controlled pressure;
(3) a step of producing an aqueous solution or aqueous dispersion liquid of the manganese component and/or the cobalt component from a raw material manganese compound and/or a raw material cobalt compound as well as an aqueous dispersion medium; and
(4) a step of mixing the tin component-containing titanium oxide particle dispersion liquid produced in the step (2) and the aqueous solution or aqueous dispersion liquid of the manganese component and/or the cobalt component that is produced in the step (3).

Effects of the Invention

Since the titanium oxide particles, particularly the titanium oxide particle dispersion liquid of the present invention has a drastically inhibited photocatalytic activity, it can prevent a resin from being deteriorated by photocatalytic activity even when added to or applied to the surface of a resin; further, since this titanium oxide particle dispersion liquid has a low level of coloration and thus a high level of transparency, it will not impair the design property of a resin. Therefore, the titanium oxide particles of the present invention and the dispersion liquid thereof are useful as an inorganic ultraviolet absorber that is to be added to or applied to the surface of a resin used outdoors.

MODE FOR CARRYING OUT THE INVENTION

The present invention is described in detail hereunder.
<Titanium Oxide Particles>
The titanium oxide particles of the present invention are titanium oxide particles containing:
(1) a tin component; and
(2) a manganese component and/or a cobalt component,
in which only the tin component is solid-dissolved in the titanium oxide particles, and the manganese component and/or the cobalt component are each contained by an amount of 5 to 5,000 in terms of a molar ratio to titanium (Ti/Mn and/or Ti/Co); particularly, it is desired that the titanium oxide particles be used as a dispersion liquid.
<Titanium Oxide Particle Dispersion Liquid>
The titanium oxide particle dispersion liquid of the present invention is a dispersion liquid that contains, in an aqueous dispersion medium, (1) the titanium oxide particles with the tin component solid-dissolved therein, and (2) the manganese component and/or the cobalt component.

Here, in this specification, a solid solution refers to that having a phase where atoms at lattice points in a certain crystal phase have been substituted by other atoms or where other atoms have entered lattice spacings i.e. a mixed phase regarded as one with a different substance(s) dissolved into a certain crystal phase, and being a homogeneous phase as a crystal phase. A solid solution where solvent atoms at lattice points have been substituted by solute atoms is called a substitutional solid solution, and a solid solution where solute atoms have entered lattice spacings is called an interstitial solid solution; in this specification, a solid solution refers to both of them.

In the case of the titanium oxide particles of the present invention, the titanium oxide particles are characterized by forming a solid solution with tin atoms. The solid solution may be either substitutional or interstitial. A substitutional solid solution of titanium oxide is formed by having titanium sites of a titanium oxide crystal substituted by various metal atoms; an interstitial solid solution of titanium oxide is formed by having various metal atoms enter the lattice spacings of a titanium oxide crystal. After various metal atoms have been solid-dissolved into titanium oxide, when measuring the crystal phase by X-ray diffraction or the like, there will only be observed the peak of the crystal phase of titanium oxide, whereas there will not be observed peaks of compounds derived from various metal atoms added.

While there are no particular restrictions on a method for solid-dissolving dissimilar metals into a metal oxide crystal, there may be listed, for example, a gas phase method (e.g. CVD method, PVD method), a liquid phase method (e.g. hydrothermal method, sol-gel process) and a solid phase method (e.g. high-temperature firing).

As a crystal phase of titanium oxide particles, there are generally known three of them which are the rutile-type, anatase-type and brookite-type. It is preferred that the titanium oxide particles mainly employ the rutile-type or anatase-type crystal phase. Here, the expression "mainly" refers to a condition where the titanium oxide particles having such particular crystal phase(s) are contained in the titanium oxide particles as a whole by an amount of not smaller than 50% by mass, preferably not smaller than 70% by mass, even more preferably not smaller than 90% by mass, or even 100% by mass.

Further, as a dispersion medium of the dispersion liquid, an aqueous solvent is normally used, and it is preferred that water be used. However, there may also be used a mixed solvent of water and a hydrophilic organic solvent which is to be mixed with water at any ratio. As water, preferred are purified waters such as a filtrate water, a deionized water, a distilled water and a pure water. Moreover, as the hydrophilic organic solvent, preferred are, for example, alcohols such as methanol, ethanol and isopropanol; glycols such as ethylene glycol; and glycol ethers such as ethylene glycol monomethyl ether, ethylene glycol monoethyl ether and propylene glycol-n-propyl ether. If using the mixed solvent, it is preferred that a ratio of the hydrophilic organic solvent in the mixed solvent be larger than 0% by mass, but not larger than 50% by mass; more preferably larger than 0% by mass, but not larger than 20% by mass; even more preferably larger than 0% by mass, but not larger than 10% by mass.

The titanium oxide particles are titanium oxide particles with the tin component solid-dissolved in titanium oxide used as an ultraviolet absorber, and are preferably titanium oxide particles with the tin component solid-dissolved therein, but with no manganese and cobalt component(s) solid-dissolved therein. This is because titanium oxide will be colored if the manganese component and the cobalt component are solid-dissolved therein, which may then impair the design property of a resin to which the titanium oxide particles are applied. Here, in the present invention, the expression "the titanium oxide particle dispersion liquid contains the manganese component and/or the cobalt component" means that the manganese component and/or the cobalt component are contained in the dispersion liquid, not that the manganese component and/or the cobalt component are solid-dissolved in the titanium oxide particles.

While the tin component to be solid-dissolved in the titanium oxide particles is to inhibit photocatalytic activity, it will suffice if the tin component is that derived from a tin compound, examples of which include elemental tin as a metal (Sn), a tin oxide (SnO, $SnO_2$), a tin hydroxide, a tin chloride ($SnCl_2$, $SnCl_4$), a tin nitrate ($Sn(NO_3)_2$), a tin sulfate ($SnSO_4$), a tin halide (Br, I), a salt of tin-oxoacid (stannate) ($Na_2SnO_3$, $K_2SnO_3$) and a tin complex compound; there may be used one of them or a combination of two or more of them. Particularly, it is preferred that there be used a tin oxide (SnO, $SnO_2$), a tin chloride ($SnCl_2$, $SnCl_4$), a tin sulfate ($SnSO_4$) and a salt of tin-oxoacid (stannate) ($Na_2SnO_3$, $K_2SnO_3$).

The tin component is preferably contained in the titanium oxide particles by an amount of 1 to 1,000, more preferably 5 to 500, even more preferably 5 to 100, in terms of a molar ratio to titanium (Ti/Sn). This is because if the molar ratio is lower than 1, an ultraviolet absorption effect may not be sufficiently exhibited as titanium oxide is now contained at a lower rate; and if the molar ratio is greater than 1,000, an insufficient photocatalytic activity inhibition effect may be observed. Here, it is preferred that only tin be solid-dissolved in titanium oxide.

As the manganese component and/or the cobalt component to be added to the titanium oxide particles, there may be listed, for example, a metal, an oxide, a hydroxide, a chloride, a nitrate, a sulfate, a halide (Br, I), a salt of oxoacid and a complex compound; there may be used one of them or a combination of two or more of them.

The amount of the manganese component and/or the cobalt component to be added to the titanium oxide particles may be appropriately determined based on the type of the metal component; it is preferred that the amount thereof be 5 to 5,000 in terms of a molar ratio to titanium (Ti/Mn and/or Ti/Co).

When manganese is selected as the metal component to be added to the titanium oxide particles, it will suffice if the manganese component is that derived from a manganese compound, examples of which include elemental manganese as a metal (Mn), a manganese oxide (MnO, $MnO_2$, $Mn_2O_3$, $Mn_3O_4$), a manganese hydroxide, a manganese chloride ($MnCl_2$), a manganese nitrate ($Mn(NO_3)_2$), a manganese sulfate ($MnSO_4$), a manganese halide (Br, I), a manganic acid and salt of manganese-oxoacid (manganate) ($H_2MnO_4$, $HMnO_4$, $Na_2MnO_4$, $Na_2MnO_4$, $K_2MnO_4$, $KMnO_4$), and a manganese complex compound; there may be used one of them or a combination of two or more of them. Particularly, it is preferred that there be used a manganese chloride ($MnCl_2$), a manganese nitrate ($Mn(NO_3)_2$) and a manganese sulfate ($MnSO_4$).

The manganese component is preferably added to the titanium oxide particles by an amount of 5 to 5,000, more preferably 10 to 3,000, even more preferably 10 to 1,000, in terms of a molar ratio to titanium (Ti/Mn). This is because if the molar ratio is lower than 5, the ultraviolet absorption effect may not be sufficiently exhibited as titanium oxide is now contained at a lower rate; and if the molar ratio is greater than 5,000, an insufficient photocatalytic activity inhibition effect may be observed.

When cobalt is selected as the metal component to be added to the titanium oxide particles, it will suffice if the cobalt component is that derived from a cobalt compound, examples of which include elemental cobalt as a metal (Co), a cobalt oxide (CoO, $Co_2O_3$), a cobalt hydroxide, a cobalt chloride ($CoCl_2$), a cobalt nitrate ($Co(NO_3)_2$), a cobalt sulfate ($CoSO_4$), a cobalt halide (Br, I), a cobaltic acid and salt of cobalt-oxoacid (cobaltate), and a cobalt complex compound; there may be used one of them or a combination of two or more of them. Particularly, it is preferred that there be used a cobalt chloride ($CoCl_2$), a cobalt nitrate ($Co(NO_3)_2$) and a cobalt sulfate ($CoSO_4$).

The cobalt component is preferably added to the titanium oxide particles by an amount of 5 to 5,000, more preferably 10 to 3,000, even more preferably 10 to 1,000, in terms of a molar ratio to titanium (Ti/Co). This is because if the molar ratio is lower than 5, the ultraviolet absorption effect may not be sufficiently exhibited as titanium oxide is now contained at a lower rate; and if the molar ratio is greater than 5,000, an insufficient photocatalytic activity inhibition effect may be observed.

When both manganese and cobalt are selected as the metal components to be added to the titanium oxide particles, while the amount of each component is within the above ranges, a molar ratio of a sum total of these components to titanium [Ti/(Mn+Co)] is not lower than 5, but lower than 10,000.

As the titanium oxide particles, one kind thereof may be used, or two or more kinds thereof may be used in combination.

The titanium oxide particle dispersion liquid may further contain a silicon component. When mixed with the silicon component, there can be inhibited an agglomeration of the titanium oxide particles that occurs as a result of adding the manganese component and/or the cobalt component.

It will suffice if the silicon component is that derived from a silicon compound, examples of which include elemental silicon as a metal (Si), a silicon oxide (SiO, $SiO_2$), a silicon alkoxide ($Si(OCH_3)_4$, $Si(OC_2H_5)_4$, $Si(OCH(CH_3)_2)_4$), a silicate (sodium silicate, potassium silicate), and an active silicic acid obtained by removing ions such as sodium ions and potassium ions from such silicate; there may be used one of them or a combination of two or more of them. Particularly, it is preferred that there be used a silicate (sodium silicate) and an active silicic acid.

The silicon component may at first be mixed into a solution or dispersion liquid of the manganese component and/or the cobalt component, followed by mixing such solution or dispersion liquid with the titanium oxide particle dispersion liquid; or the silicon component may at first be mixed into the titanium oxide particle dispersion liquid, followed by mixing such titanium oxide particle dispersion liquid with a solution or dispersion liquid of the manganese component and/or the cobalt component.

The silicon component is preferably contained in the titanium oxide particle dispersion liquid by an amount of 0.1 to 1,000, more preferably 0.5 to 200, even more preferably 1 to 100, in terms of a molar ratio to titanium (Ti/Si). This is because if the molar ratio is lower than 0.1, the ultraviolet absorption effect may not be sufficiently exhibited as titanium oxide is now contained at a lower rate; and if the molar ratio is greater than 1,000, an insufficient agglomeration inhibition effect may be observed.

After adjusting the solid content concentration of the titanium oxide particle dispersion liquid to 1% by mass, a colorimeter is then used to perform transmission measurement with a distilled water being a reference (according to JIS Z 8722 (FOV: 10°, light source: D65, measurement condition: St, f, W10)), thereby obtaining a color value (L*a*b*) of the titanium oxide particle dispersion liquid.

A degree of coloration of the titanium oxide particle dispersion liquid of the present invention is evaluated by a color difference ($\Delta E^*_{ab}$) with the following comparative sample.

(a) Comparative sample: Titanium oxide particle dispersion liquid (solid content concentration 1% by mass) in which the tin component is solid-dissolved and is contained by an amount of 20 in terms of a molar ratio to titanium (Ti/Sn).

(b) Target sample to be evaluated: Titanium oxide particle dispersion liquid of the present invention i.e. the titanium oxide particle dispersion liquid (solid content concentration 1% by mass) of the titanium oxide particles containing (1) the tin component solid-dissolved in the titanium oxide particles; and (2) the manganese component and/or the cobalt component, where the manganese component and/or the cobalt component are contained by the amount of 5 to 5,000 in terms of the molar ratio to titanium (Ti/Mn and/or Ti/Co).

Specifically, after adjusting the solid content concentration of the dispersion liquid of each of the comparative sample and the target sample to be evaluated to 1% by mass, the following formula disclosed in JIS Z 8781-4 is then used to calculate a color difference ($\Delta E^*_{ab}$) between the two color values (L*a*b*) that are obtained by the above method.

$$\Delta E^*_{ab} = [(\Delta L^*)^2 + (\Delta a^*)^2 + (\Delta b^{**})^2]^{1/2}$$ [Formula 1]

The titanium oxide particle dispersion liquid of the comparative sample in which the tin component is solid-dissolved by the amount of 20 in terms of the molar ratio to titanium (Ti/Sn), exhibited a low level of coloration; this dispersion liquid shall not impair the design property of a resin even when combined with or applied to the surface of the resin.

It is preferred that the color difference ($\Delta E^*_{ab}$) with the comparative sample be not larger than 30, more preferably not larger than 20.

This is because if the color difference is greater than 30, the design property of a resin may be impaired by coloration.

Here, as a device for measuring the color values (L*a*b*) of the above dispersion liquids, there may be used, for example, a spectrophotometer for color and turbidity TZ7700 (by Nippon Denshoku Industries Co., Ltd), and a spectrophotometer CM-5 (by KONICA MINOLTA JAPAN, INC.).

It is preferred that the titanium oxide particles in the titanium oxide particle dispersion liquid containing the manganese component and/or the cobalt component have a particle diameter of 3 to 50 nm, more preferably 3 to 30 nm, even more preferably 3 to 20 nm, the particle diameter being a 50% cumulative distribution diameter (possibly referred to as $D_{50}$ hereunder) on volumetric basis that is measured by a dynamic light scattering method using a laser light. This is because if $D_{50}$ is smaller than 3 nm, an insufficient ultraviolet absorption effect may be observed; and if $D_{50}$ is greater than 50 nm, the dispersion liquid may be opaque.

Further, it is preferred that a 90% cumulative distribution diameter (possibly referred to as $D_{90}$ hereunder) on volumetric basis that is measured by a dynamic light scattering method using a laser light be 5 to 100 nm, more preferably 5 to 80 nm. This is because if $D_{90}$ is smaller than 5 nm, an insufficient ultraviolet absorption effect may be observed; and if $D_{90}$ is greater than 100 nm, the dispersion liquid may be opaque.

It is preferable if the titanium oxide particles of the present invention are fine particles whose $D_{50}$ and $D_{90}$ are within the above ranges, because an ultraviolet absorption effect will be exhibited, and the dispersion liquid will be transparent.

Here, as a device for measuring $D_{50}$ and $D_{90}$ of the titanium oxide particles in the dispersion liquid, there may be used, for example, ELSZ-2000ZS (by Otsuka Electronics Co., Ltd.), NANOTRAC UPA-EX150 (by Nikkiso Co., Ltd.), and LA-910 (by HORIBA, Ltd.).

<Method for Producing Titanium Oxide Particle Dispersion Liquid>

The titanium oxide particle dispersion liquid of the present invention is prepared by separately producing a titanium oxide particle dispersion liquid with the tin component solid-dissolved therein, and an aqueous solution or aqueous dispersion liquid of the manganese component and/or the cobalt component; and then mixing the titanium oxide particle dispersion liquid with the tin component solid-dissolved therein and the solution or dispersion liquid of the manganese component and/or the cobalt component.

As a method for producing the manganese component and/or cobalt component-containing titanium oxide particle dispersion liquid with the tin component solid-dissolved therein, there may be specifically employed a production method having the following steps (1) to (4).

(1) A step of producing a tin component-containing peroxotitanic acid solution from a raw material titanium compound, tin compound, basic substance, hydrogen peroxide and aqueous dispersion medium.

(2) A step of producing a tin component-containing titanium oxide particle dispersion liquid by heating the tin component-containing peroxotitanic acid solution produced in the step (1) at 80 to 250° C. under a controlled pressure.

(3) A step of producing an aqueous solution or aqueous dispersion liquid of the manganese component and/or the cobalt component from a raw material manganese compound and/or a raw material cobalt compound as well as an aqueous dispersion medium.

(4) A step of mixing the tin component-containing titanium oxide particle dispersion liquid produced in the step (2) and the aqueous solution or aqueous dispersion liquid of the manganese component and/or the cobalt component that is produced in the step (3).

The steps (1) and (2) are steps for obtaining the titanium oxide particle dispersion liquid with the tin component solid-dissolved therein; the step (3) is a step for obtaining the aqueous solution or aqueous dispersion liquid of the manganese component and/or the cobalt component; and the step (4) is a step for eventually obtaining the dispersion liquid containing the titanium oxide particles with the tin component solid-dissolved therein, and the manganese component and/or the cobalt component.

Each step is described in detail hereunder on such premise.

Step (1):

In the step (1), the tin component-containing peroxotitanic acid solution is produced by reacting the raw material titanium compound, tin compound, basic substance and hydrogen peroxide in the aqueous dispersion medium.

As a reaction method, there may be employed any of the following methods (i) to (iii).

(i) A method where the tin compound is added and dissolved with respect to the raw material titanium compound and basic substance in the aqueous dispersion medium to obtain a tin component-containing titanium hydroxide, followed by removing impurity ions other than metal ions to be contained, and then adding hydrogen peroxide to obtain a tin component-containing peroxotitanic acid.

(ii) A method where the basic substance is added to the raw material titanium compound in the aqueous dispersion medium to obtain a titanium hydroxide, impurity ions other than metal ions to be contained are then removed, followed by adding the tin compound, and then adding hydrogen peroxide to obtain a tin component-containing peroxotitanic acid.

(iii) A method where the basic substance is added to the raw material titanium compound in the aqueous dispersion medium to obtain a titanium hydroxide, impurity ions other than metal ions to be contained are then removed, hydrogen peroxide is then added to obtain a peroxotitanic acid, followed by adding the tin compound to obtain a tin component-containing peroxotitanic acid.

Here, in the first part of the description of the method (i), "the raw material titanium compound and basic substance in the aqueous dispersion medium" may be prepared as two separate liquids of aqueous dispersion media such as "an aqueous dispersion medium with the raw material titanium compound dispersed therein" and "an aqueous dispersion medium with the basic substance dispersed therein," and the tin compound may then be dissolved in one or both of these two liquids in accordance with the solubility thereof in these two liquids before mixing the two.

In this way, after obtaining the tin component-containing peroxotitanic acid, by subjecting such peroxotitanic acid to a later-described hydrothermal reaction in the step (2), there can be obtained titanium oxide particles with the tin component solid-dissolved in titanium oxide.

Here, examples of the raw material titanium compound include titanium chlorides; inorganic acid salts of titanium, such as titanium nitrate and titanium sulfate; organic acid salts of titanium, such as titanium formate, titanium citrate, titanium oxalate, titanium lactate and titanium glycolate; and titanium hydroxides precipitated by hydrolysis reactions as a result of adding alkalis to aqueous solutions of these chlorides and salts. There may be used one of them or a combination of two or more of them. Particularly, it is preferred that titanium chlorides ($TiCl_3$, $TiCl_4$) be used.

As for each of the tin compound and the aqueous dispersion medium, those described above are used at the compositions described above. Here, it is preferred that a concentration of a raw material titanium compound aqueous solution composed of the raw material titanium compound and aqueous dispersion medium be not higher than 60% by mass, particularly preferably not higher than 30% by mass. A lower limit of the concentration is appropriately determined; it is preferred that the lower limit be not lower than 1% by mass in general.

The basic substance is to smoothly turn the raw material titanium compound into a titanium hydroxide, examples of which include hydroxides of alkali metals or alkaline earth metals, such as sodium hydroxide and potassium hydroxide; and amine compounds such as ammonia, alkanolamine and alkylamine. Among these examples, it is particularly preferred that ammonia be used and be used in such an amount that the pH level of the raw material titanium compound aqueous solution will be 7 or higher, particularly 7 to 10. Here, the basic substance, together with the aqueous dispersion medium, may be turned into an aqueous solution having a proper concentration before use.

Hydrogen peroxide is to convert the raw material titanium compound or titanium hydroxide into a peroxotitanic acid i.e. a titanium oxide compound having a Ti—O—O—Ti bond, and is normally used in the form of a hydrogen peroxide water. It is preferred that hydrogen peroxide be added in an amount of 1.5 to 20 times the molar amount of a total substance amount of Ti and Sn. Further, in the reaction where hydrogen peroxide is added to turn the raw material titanium compound or titanium hydroxide into the peroxotitanic acid, it is preferred that a reaction temperature be 5 to 80° C., and that a reaction time be 30 min to 24 hours.

The tin component-containing peroxotitanic acid solution thus obtained may also contain an alkaline substance or acidic substance for the purpose of pH adjustment or the like. Here, examples of the alkaline substance include ammonia, sodium hydroxide, calcium hydroxide and alkylamine; examples of the acidic substance include inorganic acids such as sulfuric acid, nitric acid, hydrochloric acid, carbonic acid, phosphoric acid and hydrogen peroxide, and organic acids such as formic acid, citric acid, oxalic acid, lactic acid and glycolic acid. In this case, it is preferred that pH of the tin component-containing peroxotitanic acid solution obtained be 1 to 9, particularly preferably 4 to 7, in terms of safety in handling.

Step (2):

In the step (2), the tin component-containing peroxotitanic acid solution obtained in the step (1) is subjected to a hydrothermal reaction under a controlled pressure and at a temperature of 80 to 250° C., preferably 100 to 250° C. for 0.01 to 24 hours. An appropriate reaction temperature is 80 to 250° C. in terms of reaction efficiency and reaction controllability; as a result, the tin component-containing peroxotitanic acid will be converted into tin component-containing titanium oxide particles. Here, the expression "under a controlled pressure" refers to a condition where if the reaction temperature is greater than the boiling point of the dispersion medium, a pressure will be applied in a proper manner such that the reaction temperature will be maintained; and even a condition where if the reaction temperature is not higher than the boiling point of the dispersion medium, atmospheric pressure will be used for control. The pressure employed here is normally about 0.12 to 4.5 MPa, preferably about 0.15 to 4.5 MPa, more preferably about 0.20 to 4.5 MPa. The reaction time is preferably 1 min to 24 hours. By this step (2), there can be obtained a dispersion liquid of the tin component-containing titanium oxide particles as the titanium oxide particles.

It is preferred that the particle diameter of the titanium oxide particles obtained here fall into the ranges described above; the particle diameter can be controlled by adjusting the reaction condition(s), for example, the particle diameter can be made smaller by shortening the reaction time and a temperature rise time.

Step (3):

In the step (3), the aqueous solution or aqueous dispersion liquid of the manganese component and/or the cobalt component is produced by dissolving or dispersing the raw material manganese compound and/or the raw material cobalt compound into the aqueous dispersion medium, separately from the steps (1) and (2).

As the raw material manganese compound, there may be listed the aforementioned manganese compounds such as elemental manganese as a metal (Mn), a manganese oxide (MnO, $MnO_2$, $Mn_2O_3$, $Mn_3O_4$), a manganese hydroxide, a manganese chloride ($MnCl_2$), a manganese nitrate (Mn$(NO_3)_2$), a manganese sulfate ($MnSO_4$), a manganese halide (Br, I), a manganic acid and salt of manganese-oxoacid (manganate) ($H_2MnO_4$, $HMnO_4$, $Na_2MnO_4$, $Na_2MnO_4$, $K_2MnO_4$, $KMnO_4$), and a manganese complex compound; there may be used one of them or a combination of two or more of them. Particularly, preferred are a manganese chloride ($MnCl_2$), a manganese nitrate ($Mn(NO_3)_2$) and a manganese sulfate ($MnSO_4$).

As the raw material cobalt compound, there may be listed the aforementioned cobalt compounds such as elemental cobalt as a metal (Co), a cobalt oxide (CoO, $Co_2O_3$), a cobalt hydroxide, a cobalt chloride ($CoCl_2$), a cobalt nitrate (Co ($NO_3)_2$), a cobalt sulfate ($CoSO_4$), a cobalt halide (Br, I), a cobaltic acid and salt of cobalt-oxoacid (cobaltate), and a cobalt complex compound; there may be used one of them or a combination of two or more of them. Particularly, preferred are a cobalt chloride ($CoCl_2$), a cobalt nitrate ($Co(NO_3)_2$) and a cobalt sulfate ($CoSO_4$).

It is preferred that a raw material manganese compound concentration in the aqueous solution or aqueous dispersion liquid of the manganese component and/or the cobalt component that is produced in the step (3) be 0.001 to 10% by mass, more preferably 0.01 to 5% by mass; it is preferred that a raw material cobalt compound concentration in this aqueous solution or aqueous dispersion liquid be 0.001 to 10% by mass, more preferably 0.01 to 5% by mass.

Further, the aqueous solution or aqueous dispersion liquid of the manganese component and/or the cobalt component may also have a silicon compound dissolved or dispersed therein.

As such silicon compound, there may be listed, for example, elemental silicon as a metal (Si), a silicon oxide (SiO, $SiO_2$), a silicon alkoxide ($Si(OCH_3)_4$, $Si(OC_2H_5)_4$, $Si(OCH(CH_3)_2)_4$), a silicate (sodium silicate, potassium silicate), and an active silicic acid obtained by removing ions such as sodium ions and potassium ions from such silicate; there may be used one of them or a combination of two or more of them. Particularly, preferred are a silicate (sodium silicate) and an active silicic acid. An active silicic acid may, for example, be obtained by adding a cation exchange resin to a sodium silicate aqueous solution prepared by dissolving sodium silicate into pure water, and then removing sodium ions thereby. It is preferred that the cation exchange resin be added in such a manner that pH of an active silicic acid solution thus obtained will be 2 to 10, preferably 2 to 5.

If dissolving or dispersing a silicon compound into the aqueous solution or aqueous dispersion liquid of the manganese component and/or the cobalt component that is produced in the step (3), it is preferred that the silicon compound be dissolved or dispersed therein by an amount of 0.001 to 10% by mass, more preferably 0.01 to 5% by mass, in terms of $SiO_2$.

The solution or dispersion liquid of the manganese component and/or the cobalt component thus obtained may also contain an alkaline substance or acidic substance for the purpose of pH adjustment or the like. These alkaline substance and acidic substance may employ those similar to the ones used in the step (1), and pH adjustment here may be carried out in a similar manner as above.

Step (4):

The step (4) is to mix the titanium oxide particle dispersion liquid obtained in the step (2); and the aqueous solution or aqueous dispersion liquid of the manganese component and/or the cobalt component that is obtained in the step (3). There are no particular restrictions on a mixing method; there may be employed a stirring method using a stirrer, or a dispersion method using an ultrasonic disperser. It is preferred that a temperature at the time of performing mixing be 20 to 100° C., and that a mixing period be 1 min to 3 hours. As for a mixing ratio, mixing may simply be performed in a way such that the molar ratio of Ti to Mn and/or Co in each titanium oxide particle dispersion liquid will be the molar ratio described above.

The titanium oxide particle dispersion liquid obtained by the steps (1) to (4) may also contain an alkaline substance or acidic substance for the purpose of pH adjustment or the like; as a pH adjuster, there may be used those described above. Further, an ion-exchange treatment or a filtration washing treatment may be performed to adjust ion component concentrations, or a solvent displacement treatment may be performed to change solvent components.

The mass of the titanium oxide particles contained in the titanium oxide particle dispersion liquid can be calculated from the mass and concentration of the titanium oxide particle dispersion liquid. Here, a method for measuring the concentration of the titanium oxide particle dispersion liquid is such that part of the titanium oxide particle dispersion liquid is sampled, and the concentration is then calculated with the following formula based on the mass of a non-volatile content (titanium oxide particles) after volatilizing the solvent by performing heating at 105° C. for an hour and the mass of the titanium oxide particle dispersion liquid sampled.

Concentration of titanium oxide particle dispersion liquid (%)=[mass of not-volatile content (g)/mass of titanium oxide particle dispersion liquid (g)]×100

It is preferred that a total concentration of the manganese component and/or the cobalt component as well as the titanium oxide particles in the titanium oxide particle dispersion liquid thus prepared be 0.1 to 50% by mass, particularly preferably 0.5 to 30% by mass, in terms of ease in combining the titanium oxide particle dispersion liquid with a resin and applying the titanium oxide particle dispersion liquid to the surface of the resin. As for concentration adjustment, if the concentration is higher than a desired concentration, the concentration can be lowered via dilution by adding an aqueous solvent; if the concentration is lower than a desired concentration, the concentration can be raised by either volatilizing or filtering out the aqueous solvent. Here, the concentration can be calculated in the above manner.

The dispersion liquid obtained in the aforementioned manner can be used to form a film having a desired thickness, preferably a thickness of 10 nm to 10 μm on a base material (resin molded product) by a known coating method (e.g. brush coating, spraying, dipping, roller coating). If necessary, drying or heating may be performed.

A member of the present invention is that having the titanium oxide particle film of the present invention i.e. a member having, inside or on the surface of a base material (resin molded product), a film formed using the titanium oxide particle dispersion liquid of the present invention in the manner as described above.

WORKING EXAMPLES

The present invention is described in detail hereunder with reference to working and comparative examples. However, the present invention is not limited to the following working examples. Various measurements in the present invention were performed as follows.

(1) 50% and 90% Cumulative Distribution Diameters of Titanium Oxide Particles in Dispersion Liquid ($D_{50}$ and $D_{90}$)

$D_{50}$ and $D_{90}$ of the titanium oxide particles in the dispersion liquid were calculated as 50% and 90% cumulative distribution diameters on volumetric basis that are measured by a dynamic light scattering method using a laser light, by means of a particle size distribution measurement device (ELSZ-2000ZS by Otsuka Electronics Co., Ltd.).

(2) Color Difference ($\Delta E^*_{ab}$) of Titanium Oxide Particle Dispersion Liquid A colorimeter was used to measure a color value of the titanium oxide particle dispersion liquid as a target to be evaluated, and a color value of a comparative sample; a color difference of the titanium oxide particle dispersion liquid was then calculated based on these color values obtained.

As the comparative sample, there was used a manganese and cobalt component-free titanium oxide particle dispersion liquid (preparation example 1-1 described below) with the tin component being solid-dissolved therein by an amount of 20 in terms of a molar ratio to titanium (Ti/Sn).

Specifically, the color value (L*a*b*) was obtained by adjusting the solid content concentration of the titanium oxide particle dispersion liquid to be measured to 1% by mass, and then using a colorimeter to perform transmission measurement with a distilled water being a reference (according to JIS Z 8722 (FOV: 10°, light source: D65, measurement condition: St, f, W10)).

The abovementioned formula disclosed in JIS Z 8781-4 was then used to calculate a color difference ($\Delta E^*_{ab}$) based on the color value of the titanium oxide particle dispersion liquid that served as the target to be evaluated and was obtained by the above method, and on the color value of the titanium oxide particle dispersion liquid as the comparative sample.

(3) Acetaldehyde Gas Decomposition Capability Test of Titanium Oxide Particles

A #7 wire bar coater was used to spread each titanium oxide particle dispersion liquid prepared in working or comparative examples onto one surface of a PET film of an A4 size (210 mm×297 mm) in a manner such that a dry mass of the titanium oxide particles would be about 20 mg, thereby obtaining an evaluation sample. Drying was then performed in an oven set to 80° C. for an hour, thus obtaining a sample for use in evaluation of acetaldehyde gas decomposition capability.

Using such evaluation sample, the photocatalytic activity of the titanium oxide particles was evaluated through a decomposition reaction of an acetaldehyde gas. The evaluation was performed by a batch-wise gas decomposition capability evaluation method.

Specifically, the evaluation sample was at first placed into a 5 L stainless cell equipped with a quartz glass window. This cell was then filled with an acetaldehyde gas having an initial concentration (20 ppm) with a humidity thereof being controlled to 50%, followed by performing light irradiation with a light source provided at an upper portion of the cell. As a result of having the acetaldehyde gas decomposed by the photocatalytic action of titanium oxide, the acetaldehyde gas concentration in the cell will decrease. There, by measuring a change in such concentration, the intensity of the photocatalytic activity can be confirmed. The acetaldehyde gas concentration was measured by a photoacoustic multi-gas monitor (product name "INNOVA1412" by LumaSense Technologies) in a way such that there was measured a concentration 10 hours after starting the light irradiation, and there was confirmed a decrease in the acetaldehyde gas concentration (difference in concentration between the initial value and the value measured 10 hours later). It is indicated that the larger the decrease is, the higher the photocatalytic activity is; and that the smaller the decrease is, the lower the photocatalytic activity is.

A UV fluorescent lamp (product model number "FL10 BLB" by Toshiba Lighting & Technology Corporation) was used as a light source for the test, and ultraviolet irradiation was carried out at an irradiance of 0.5 mW/cm². At that time, the initial concentration of the acetaldehyde in the cell was set to 20 ppm.

(4) Identification of Crystal Phase of Titanium Oxide Particles

The crystal phase of the titanium oxide particles was identified in a way where the dispersion liquid of the titanium oxide particles obtained was dried at 105° C. for three hours to obtain a titanium oxide particle powder, followed by collecting the titanium oxide particle powder so as to subject the same to powder X-ray diffraction analysis, using a diffraction device (product name "Benchtop X-ray diffractometer D2 PHASER" by BRUKER AXS Co., Ltd.).

(5) Preparation of Titanium Oxide Particle Dispersion Liquid

Preparation Example 1-1

<Preparation of Titanium Oxide Particle Dispersion Liquid with Tin Solid-Dissolved Therein>

Tin chloride (IV) was added to and dissolved in a 36% by mass titanium chloride (IV) aqueous solution so that Ti/Sn (molar ratio) would be 20, followed by diluting the solution thus prepared 10 times with a pure water, and then neutralizing and hydrolyzing the same by gradually adding a 10% by mass ammonia water, thereby obtaining a precipitate of a tin-containing titanium hydroxide. pH at that time was 8. The precipitate thus obtained was then deionized by repeating the addition of pure water and decantation. A 35% by mass hydrogen peroxide water was then added to the deionized precipitate of the tin-containing titanium hydroxide so that $H_2O_2/(Ti+Sn)$ (molar ratio) would be 10, followed by performing stirring at 60° C. for two hours so as to sufficiently react the solution, thereby obtaining an orange transparent tin-containing peroxotitanic acid solution (1a).

Next, 400 mL of the tin-containing peroxotitanic acid solution (1a) was put into a 500 mL autoclave so as to be subjected to a hydrothermal treatment at 150° C. for 90 min, followed by adding a pure water to adjust the concentration thereof, thereby obtaining a dispersion liquid of titanium oxide particles (1A) with tin solid-dissolved therein (solid content concentration 1.5% by mass). As a result of performing powder X-ray diffraction analysis on the titanium oxide particles (1A), there were only observed peaks of a rutile-type titanium oxide; it was confirmed that tin was solid-dissolved in titanium oxide.

Preparation Example 1-2

<Preparation of Titanium Oxide Particle Dispersion Liquid with Tin Solid-Dissolved Therein>

A dispersion liquid of titanium oxide particles (1B) with tin solid-dissolved therein (solid content concentration 1.5% by mass) was obtained in a similar manner as the preparation example 1-1, except that tin chloride (IV) was added so that Ti/Sn (molar ratio) would be 10, and that the hydrothermal treatment was conducted for 120 min. As a result of performing powder X-ray diffraction analysis on the titanium oxide particles (1B), there were only observed peaks of a rutile-type titanium oxide; it was confirmed that tin was solid-dissolved in titanium oxide.

Preparation Example 1-3

<Preparation of Titanium Oxide Particle Dispersion Liquid with Tin and Manganese Solid-Dissolved Therein>

A dispersion liquid of titanium oxide particles (1C) with tin and manganese solid-dissolved therein (solid content concentration 1.5% by mass) was obtained in a similar manner as the preparation example 1-1, except that manganese chloride (II) was further added to the 36% by mass titanium chloride (IV) aqueous solution so that Ti/Mn (molar ratio) would be 100. As a result of performing powder X-ray diffraction analysis on the titanium oxide particles (1C), there were only observed peaks of a rutile-type titanium oxide; it was confirmed that tin and manganese were solid-dissolved in titanium oxide.

Preparation Example 1-4

<Preparation of Titanium Oxide Particle Dispersion Liquid>

A dispersion liquid of titanium oxide particles (1D) (solid content concentration 1.5% by mass) was obtained in a similar manner as the preparation example 1-1, except that tin chloride (IV) was not added to the 36% by mass titanium chloride (IV) aqueous solution, and that the hydrothermal treatment was conducted at 130° C. for 90 min. As a result of performing powder X-ray diffraction analysis on the titanium oxide particles (1D), there were observed peaks of an anatase-type titanium oxide.

Shown collectively in Table 1 are the raw material ratios, hydrothermal treatment conditions and dispersion particle diameters ($D_{50}$, $D_{90}$) of the titanium oxide particles prepared in each preparation example. The dispersion particle diameters were measured by a dynamic light scattering method using a laser light (ELSZ-2000ZS by Otsuka Electronics Co., Ltd.).

Preparation Example 2-3

<Preparation of Aqueous Solution of Manganese Chloride and Active Silicic Acid>

A sodium silicate classified as No. 3 according to JIS standard was dissolved into a pure water so that a concentration thereof would be 2% by mass in terms of $SiO_2$. While stirring such silicate soda aqueous solution, a strong acid cation exchange resin (Amberjet 1024H by Organo Corporation) was kept being added thereto until pH of the solution had become 3.9, followed by filtrating away the ion exchange resin so as to obtain an active silicic acid aqueous solution. Further, manganese (II) chloride tetrahydrate was dissolved into such active silicic acid aqueous solution so that a concentration thereof would be 0.23% by mass, thereby obtaining an aqueous solution (2C) of the manganese chloride and active silicic acid.

Preparation Example 2-4

<Preparation of Aqueous Solution of Manganese Chloride and Active Silicic Acid>

A JIS No. 3 silicate soda was dissolved into a pure water so that a concentration thereof would be 0.5% by mass in terms of $SiO_2$. While stirring such silicate soda aqueous solution, a strong acid cation exchange resin (Amberjet 1024H by Organo Corporation) was kept being added thereto until pH of the solution had become 4.0, followed by filtrating away the ion exchange resin so as to obtain an active silicic acid aqueous solution. Further, manganese (II) chloride tetrahydrate was dissolved into such active silicic acid aqueous solution so that a concentration thereof would be 0.23% by mass, thereby obtaining an aqueous solution (2D) of the manganese chloride and active silicic acid.

TABLE 1

| Preparation example | Titaniumoxide particle dispersion liquid | Molar ratio Ti/Sn | Molar ratio Ti/Mn | Hydrothermal treatment Temperature (° C.) | Hydrothermal treatment Time (min) | Particle diameter $D_{50}$ (nm) | Particle diameter $D_{90}$ (nm) |
|---|---|---|---|---|---|---|---|
| 1-1 | 1A | 20 | — | 150 | 90 | 9 | 13 |
| 1-2 | 1B | 10 | — | 150 | 120 | 6 | 12 |
| 1-3 | 1C | 20 | 100 | 150 | 90 | 10 | 16 |
| 1-4 | 1D | — | — | 130 | 90 | 15 | 21 |

(6) Preparation of Solution of Manganese Component and/or Cobalt Component

Preparation Example 2-1

<Preparation of Manganese Chloride Aqueous Solution>

A manganese chloride aqueous solution (2A) was obtained by dissolving manganese (II) chloride tetrahydrate into a pure water so that a concentration thereof would be 0.23% by mass.

Preparation Example 2-2

<Preparation of Cobalt Chloride Aqueous Solution>

A cobalt chloride aqueous solution (2B) was obtained by dissolving cobalt (II) chloride hexahydrate into a pure water so that a concentration thereof would be 0.63% by mass.

Preparation Example 2-5

<Preparation of Active Silicic Acid Aqueous Solution>

A JIS No. 3 silicate soda was dissolved into a pure water so that a concentration thereof would be 2% by mass in terms of $SiO_2$. While stirring such silicate soda aqueous solution, a strong acid cation exchange resin (Amberjet 1024H by Organo Corporation) was kept being added thereto until pH of the solution had become 3.9, followed by filtrating away the ion exchange resin so as to obtain an active silicic acid aqueous solution (2E).

(7) Preparation of Titanium Oxide Particle Dispersion Liquid

Working Example 1

A titanium oxide particle dispersion liquid (E-1) was obtained by mixing the titanium oxide particle dispersion liquid (1A) and the manganese chloride aqueous solution (2A) so that Ti/Mn (molar ratio) would be 434.

Working Example 2

A titanium oxide particle dispersion liquid (E-2) was obtained by mixing the titanium oxide particle dispersion liquid (1A) and the manganese chloride aqueous solution (2A) so that Ti/Mn (molar ratio) would be 2,174.

Working Example 3

A titanium oxide particle dispersion liquid (E-3) was obtained by mixing the titanium oxide particle dispersion liquid (1B) and the cobalt chloride aqueous solution (2B) so that Ti/Co (molar ratio) would be 187.

Working Example 4

A titanium oxide particle dispersion liquid (E-4) was obtained by mixing the titanium oxide particles (1A) and the aqueous solution (2C) of the manganese chloride and active silicic acid so that Ti/Mn (molar ratio) would be 92, and Ti/Si (molar ratio) would be 3.

Working Example 5

A titanium oxide particle dispersion liquid (E-5) was obtained by mixing the titanium oxide particles (1A) and the aqueous solution (2C) of the manganese chloride and active silicic acid so that Ti/Mn (molar ratio) would be 434, and Ti/Si (molar ratio) would be 15.

Working Example 6

A titanium oxide particle dispersion liquid (E-6) was obtained by mixing the titanium oxide particles (1A) and the aqueous solution (2D) of the manganese chloride and active silicic acid so that Ti/Mn (molar ratio) would be 48, and Ti/Si (molar ratio) would be 7.

Comparative Example 1

A titanium oxide particle dispersion liquid (C-1) was obtained only from the titanium oxide particles (1A).

Comparative Example 2

A titanium oxide particle dispersion liquid (C-2) was obtained only from the titanium oxide particles (1C).

Comparative Example 3

A titanium oxide particle dispersion liquid (C-3) was obtained by mixing the titanium oxide particles (1D) and the manganese chloride aqueous solution (2A) so that Ti/Mn (molar ratio) would be 2,174.

Comparative Example 4

A titanium oxide particle dispersion liquid (C-4) was obtained by mixing the titanium oxide particles (1A) and the active silicic acid aqueous solution (2E) so that Ti/Si (molar ratio) would be 3.

Table 2 collectively shows the liquids and the molar ratios of the metals that are employed in the titanium oxide dispersion liquids prepared in the working and comparative examples.

TABLE 2

| Evaluation sample | | Liquid used | Molar ratio | | | |
|---|---|---|---|---|---|---|
| | | | Ti/Sn | Ti/Mn | Ti/Co | Ti/Si |
| Working example 1 | E-1 | 1A 2A | 20 | 434 | | |
| Working example 2 | E-2 | 1A 2A | 20 | 2174 | | |
| Working example 3 | E-3 | 1B 2B | 10 | | 187 | |
| Working example 4 | E-4 | 1A 2C | 20 | 92 | | 3 |
| Working example 5 | E-5 | 1A 2C | 20 | 434 | | 15 |
| Working example 6 | E-6 | 1A 2D | 20 | 48 | | 7 |
| Comparative example 1 | C-1 | 1A | 20 | | | |
| Comparative example 2 | C-2 | 1C | 20 | 100 | | |
| Comparative example 3 | C-3 | 1D 2A | — | 2174 | | |
| Comparative example 4 | C-4 | 1A 2E | 20 | | | 3 |

Table 3 collectively shows the dispersion particle diameters ($D_{50}$, $D_{90}$) of the titanium oxide particle dispersion liquids; the results of the acetaldehyde gas decomposition test (a concentration after 10 hours, and a decrease in concentration); the color values (L*a*b*); and the color differences ($\Delta E^*_{ab}$) with the titanium oxide particle dispersion liquid as the comparative sample. The dispersion particle diameters were measured by a dynamic light scattering method using a laser light (ELSZ-2000ZS (by Otsuka Electronics Co., Ltd.)), and the color values were measured by the spectrophotometer for color and turbidity TZ7700 (by Nippon Denshoku Industries Co., Ltd).

TABLE 3

| Evaluation sample | | Evaluation result | | | | | | | |
|---|---|---|---|---|---|---|---|---|---|
| | | $D_{50}$ (nm) | $D_{90}$ (nm) | Concentration after 10 h (ppm) | Decrease (ppm) | L* | a* | b* | $\Delta E^*_{ab}$ |
| Working example 1 | E-1 | 32 | 78 | 17 | 3 | 65.37 | 5.39 | 33.59 | 22.83 |
| Working example 2 | E-2 | 24 | 57 | 13 | 7 | 75.01 | 2.44 | 27.46 | 11.60 |
| Working example 3 | E-3 | 30 | 84 | 15 | 5 | 67.24 | 3.6 | 27.24 | 19.33 |
| Working example 4 | E-4 | 17 | 24 | 20 | 0 | 85.63 | 2.28 | 32.2 | 6.80 |
| Working example 5 | E-5 | 17 | 25 | 18 | 2 | 83.58 | 3.26 | 29.86 | 5.40 |

TABLE 3-continued

| | Evaluation sample | $D_{50}$ (nm) | $D_{90}$ (nm) | Evaluation result Concentration after 10 h (ppm) | Decrease (ppm) | $L^*$ | $a^*$ | $b^*$ | $\Delta E^*_{ab}$ |
|---|---|---|---|---|---|---|---|---|---|
| Working example 6 | E-6 | 19 | 26 | 20 | 0 | 76.54 | 8.09 | 40.81 | 19.26 |
| Comparative example 1 | C-1 | 15 | 22 | 0 | 20 | 86.42 | 1.97 | 25.45 | 0.00 |
| Comparative example 2 | C-2 | 11 | 18 | 20 | 0 | 70.03 | 20.08 | 66.11 | 47.43 |
| Comparative example 3 | C-3 | 17 | 26 | 3 | 17 | 84.14 | 2.21 | 29.72 | 4.85 |
| Comparative example 4 | C-4 | 19 | 26 | 0 | 20 | 86.16 | 2.12 | 25.02 | 0.52 |

As can be seen from the results of the comparative examples 1 and 4, the manganese and/or cobalt component-free titanium oxides each exhibited a high acetaldehyde gas decomposition capability and thus a high photocatalytic activity.

As can be seen from the result of the comparative example 2, the titanium oxide with manganese solid-dissolved therein exhibited a large color difference, although the photocatalytic activity thereof was inhibited.

As can be seen from the results of the comparative example 3 and working example 2, the titanium oxides with no tin solid-dissolved therein each exhibited a high photocatalytic activity even when containing the manganese component.

The invention claimed is:

1. Titanium oxide particles comprising:
   (1) a tin component; and
   (2) a manganese component and/or a cobalt component, wherein only the tin component is solid-dissolved in the titanium oxide particles, and the manganese component and/or the cobalt component are each contained by an amount of 5 to 5,000 in terms of a molar ratio to titanium (Ti/Mn and/or Ti/Co).

2. A member having a film of the titanium oxide particles according to claim 1.

3. A titanium oxide particle dispersion liquid comprising:
   (1) titanium oxide particles with a tin component solid-dissolved therein; and
   (2) a manganese component and/or a cobalt component, wherein only the tin component is solid-dissolved in the titanium oxide particles, and the manganese component and/or the cobalt component are each contained by an amount of 5 to 5,000 in terms of a molar ratio to titanium (Ti/Mn and/or Ti/Co).

4. The titanium oxide particle dispersion liquid according to claim 3, wherein a color difference ($\Delta E^*_{ab}$) between
   (a) a titanium oxide particle dispersion liquid in which a solid content concentration is 1% by mass, and the tin component is solid-dissolved and contained by an amount of 20 in terms of a molar ratio to titanium (Ti/Sn); and
   (b) the titanium oxide particle dispersion liquid in which a solid content concentration is 1% by mass, is not larger than 30.

5. The titanium oxide particle dispersion liquid according to claim 3 further comprising a silicon component.

6. The titanium oxide particle dispersion liquid according to claim 3, wherein the tin component solid-dissolved in titanium oxide is contained by an amount of 1 to 1,000 in terms of a molar ratio to titanium (Ti/Sn).

7. The titanium oxide particle dispersion liquid according to claim 3, wherein the manganese component and/or the cobalt component are each contained by an amount of 10 to 3,000 in terms of a molar ratio to titanium (Ti/Mn and/or Ti/Co).

8. A method for producing the titanium oxide particle dispersion liquid according to claim 3, comprising:
   (1) a step of producing a tin component-containing peroxotitanic acid solution from a raw material titanium compound, tin compound, basic substance, hydrogen peroxide and aqueous dispersion medium;
   (2) a step of producing a tin component-containing titanium oxide particle dispersion liquid by heating the tin component-containing peroxotitanic acid solution produced in the step (1) at 80 to 250° C. under a controlled pressure;
   (3) a step of producing an aqueous solution or aqueous dispersion liquid of the manganese component and/or the cobalt component from a raw material manganese compound and/or a raw material cobalt compound as well as an aqueous dispersion medium; and
   (4) a step of mixing the tin component-containing titanium oxide particle dispersion liquid produced in the step (2) and the aqueous solution or aqueous dispersion liquid of the manganese component and/or the cobalt component that is produced in the step (3).

* * * * *